(12) United States Patent
Kurth et al.

(10) Patent No.: US 8,682,487 B2
(45) Date of Patent: Mar. 25, 2014

(54) MULTI-DIRECTIONALLY MOVABLE VEHICLE, AND METHOD

(75) Inventors: Johannes Kurth, Augsburg (DE); Günter Schreiber, Friedberg (DE); Mario Selic, Augsburg (DE)

(73) Assignee: KUKA Laboratories GmbH, Augsburg (DE)

( * ) Notice: Subject to any disclaimer, the term of this patent is extended or adjusted under 35 U.S.C. 154(b) by 579 days.

(21) Appl. No.: 12/993,670

(22) PCT Filed: Jun. 3, 2009

(86) PCT No.: PCT/EP2009/003967
§ 371 (c)(1), (2), (4) Date: Dec. 23, 2010

(87) PCT Pub. No.: WO2009/146899
PCT Pub. Date: Dec. 10, 2009

(65) Prior Publication Data
US 2011/0098855 A1     Apr. 28, 2011

(30) Foreign Application Priority Data
Jun. 6, 2008  (DE) .......................... 10 2008 002 274

(51) Int. Cl.
*G05B 19/18* (2006.01)
*G06F 17/00* (2006.01)

(52) U.S. Cl.
USPC .......................................... 700/250; 700/245

(58) Field of Classification Search
USPC .............. 340/901, 425.5, 435, 436, 463, 468, 340/475, 478
See application file for complete search history.

(56) References Cited

U.S. PATENT DOCUMENTS 3,781,604 A * 12/1973 Scarpino ...................... 315/312
3,876,255 A    4/1975 Ilon
(Continued)

FOREIGN PATENT DOCUMENTS

DE          203 12 334 U1    3/2004
DE     20 2004 015 422 U1   12/2004
JP          51 127277 U     10/1976

OTHER PUBLICATIONS

Takafumi Matsumaru (2008). Mobile Robot with Preliminary-Announcement and Indication of Scheduled Route and Occupied Area Using Projector, Motion Planning, Xing-Jian Jing (Ed.), ISBN: 978-953-7619-01-5, InTech.*

(Continued)

*Primary Examiner* — Khoi Tran
*Assistant Examiner* — Nicholas Kiswanto
(74) *Attorney, Agent, or Firm* — Wood, Herron & Evans, LLP

(57) ABSTRACT

The present invention relates to a multi-directionally movable vehicle (10, 20) and to a method for operating the multi-directionally movable vehicle (10, 20). The vehicle (10, 20) has a vehicle body (11, 12), a plurality of multi-directionally movable wheels (13) which are rotatably arranged on the vehicle body (11, 12) and have the purpose of moving the vehicle (10), and a plurality of lighting devices (14, 15) which are each assigned to one of the wheels (13) and which can be activated as a function of the selected or intended direction of travel of the vehicle (10) in order to indicate visually to the outside the direction of travel of the vehicle (10) by means of one or more activated lighting devices (14, 15).

19 Claims, 3 Drawing Sheets

(56) References Cited

U.S. PATENT DOCUMENTS

Figure 1A:
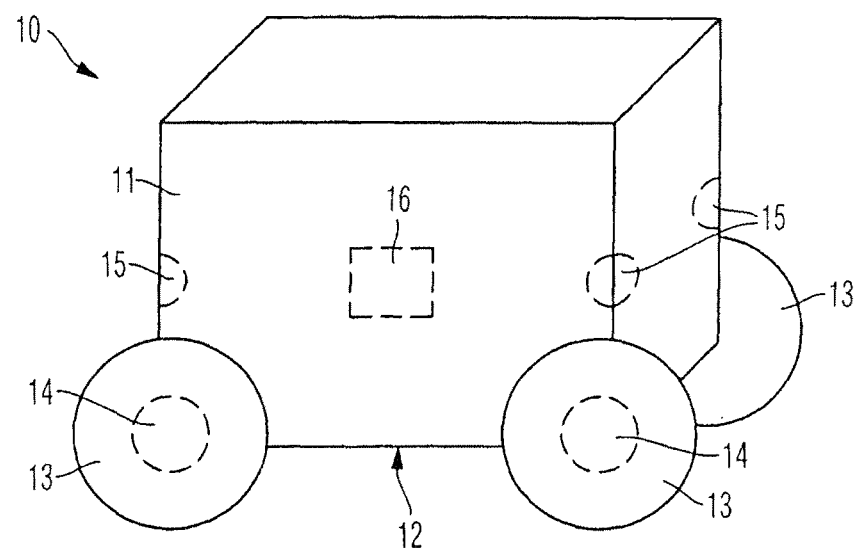

| | | | |
|---|---|---|---|
| 5,089,805 A * | 2/1992 | Salsman | 340/467 |
| 5,548,274 A * | 8/1996 | Anderson et al. | 340/468 |
| 6,396,395 B1 * | 5/2002 | Zielinski et al. | 340/425.5 |
| 6,641,041 B2 * | 11/2003 | Olds et al. | 235/454 |
| 7,377,676 B2 * | 5/2008 | Thomas et al. | 362/500 |
| 7,408,455 B2 * | 8/2008 | Ponziani | 340/476 |
| 7,493,217 B2 * | 2/2009 | Lo et al. | 701/301 |
| 7,783,399 B1 * | 8/2010 | Young et al. | 701/36 |
| 8,096,069 B2 * | 1/2012 | Ishikawa et al. | 40/591 |
| 8,322,901 B2 * | 12/2012 | Michelotti | 362/500 |
| 2007/0199108 A1 * | 8/2007 | Angle et al. | 901/17 |
| 2008/0162027 A1 * | 7/2008 | Murphy et al. | 701/117 |

OTHER PUBLICATIONS

European Patent Office; Search Report in International Patent Application No. PCT/EP2009/003967 dated Sep. 25, 2009; 4 pages.

* cited by examiner

MULTI-DIRECTIONALLY MOVABLE VEHICLE, AND METHOD

The present invention relates to a multi-directionally movable vehicle and to a method for operating the multi-directionally movable vehicle.

The present invention relates to vehicles, such as robot vehicles, which are multidirectionally and in particular omnidirectionally movable. For this purpose, such vehicles have omnidirectional wheels, or so-called omniwheels. One example of such an omnidirectional wheel is the so-called Mecanum wheel, which is described for example in U.S. Pat. No. 3,876,255. Such an omnidirectional wheel is able to move in any direction. DE 20 2004 015 422 U1 describes an omnidirectional vehicle which is equipped with Mecanum wheels.

Such omnidirectionally movable vehicles are controlled for example by a control device internal to the vehicle. The motion of this omnidirectional platform, i.e., the direction of motion, motion velocity, changes of direction and the like, are thus program-controlled in this case. Such platforms are thus autonomously mobile, which however introduces the danger of a collision with objects and above all with persons in the vicinity of these platforms. This must be prevented insofar as possible, through suitable measures.

Mobile platforms for robots, such as driverless transport systems (DTS), have visual display devices in the form of rotating signal lamps, which emit an appropriate visual warning signal when this mobile platform is in operation. Persons in the vicinity of the mobile platform are made aware of its motion by these rotating signal lamps. More detailed information about this mobile platform, for example the direction of motion, velocity, an intended change of direction, etc., cannot be obtained from the visual warning signal emitted by the signal lamp.

But it is problematic with such omnidirectionally movable platforms that a person in the vicinity of this platform is unable to anticipate the direction of motion of this omnidirectionally movable platform. It can therefore be difficult for that person to stay away from this platform, especially when this mobile platform changes direction abruptly.

This problem is particularly serious immediately before the omnidirectionally movable platform starts up again from a standstill. A peculiarity of such omnidirectionally movable platforms is that they are able to change their direction of motion to any direction, even when standing still. A person who is in the immediate vicinity of the omnidirectionally movable platform therefore never knows what direction this platform will move in the next instant. This increases the risk of accidents.

Against that background, one object of the present invention is to specify a safe possibility for operating multidirectional vehicles.

The object of the invention is fulfilled by a multidirectionally movable vehicle having a vehicle body, a plurality of multidirectionally movable wheels situated on the vehicle body for moving the vehicle, and a plurality of illumination devices which are each assigned to one of the wheels and which are activatable depending on the chosen or intended direction of travel of the vehicle, in order to visually indicate the direction of travel of the vehicle outwardly by one or more activated illumination devices.

An additional aspect of the invention relates to a method for operating a multidirectionally movable vehicle, wherein, depending on the chosen and/or intended direction of motion of the vehicle, at least one and in particular two wheels are illuminated by means of a vehicle-mounted illumination device assigned to these particular wheels in such a way that the chosen and/or intended direction of motion of the vehicle is visually indicated outwardly by this visual signal.

Thus a signal system is possibly installed on a multidirectionally movable vehicle, which displays information about the planned direction of motion of this vehicle visually to an outside person. To this end, according to the invention a controllable illumination device is provided, which emits a visual signal, depending on the chosen or perhaps even an intended direction of travel of the vehicle, which is unambiguously assignable to the chosen or intended direction of travel of the vehicle. This is accomplished by these illumination devices being assigned to the various wheels of the vehicle, and thus also being able to emit a visual information signal assigned to a particular wheel. An outside person would interpret such a visual signal assigned to a particular wheel to mean that that wheel, and hence the entire vehicle, would be moved in the direction corresponding to that wheel. In the case of visual signals assigned for example to two different wheels, it could be deduced therefrom by analogy that the vehicle would travel in the direction of those two wheels.

The vehicle according to the invention may have a control device that is coupled to the illumination devices, and that serves to control the illumination devices.

Particularly simply, and furthermore particularly attractively for marketing reasons, the illumination device may be integrated into or mounted on a multidirectional wheel of the vehicle, for example in the area of its wheel rim. In this case the wheel would be illuminated directly (from inside, so to speak), and thereby indicate the visual directional information to the outside observer. Alternatively, it would naturally also be conceivable to dispose the illumination device in the area of a possibly existing fender or wheel house of the appropriate wheel. Alternatively, it would also be conceivable to attach the illumination device to the body in such a way that a particular assigned wheel, or perhaps also the wheel house, is illuminated thereby. Furthermore, other solutions would certainly also be conceivable.

According to one embodiment of the vehicle according to the invention, the latter includes four multidirectionally movable wheels, and in particular four omnidirectionally movable wheels, of which each has an illumination device assigned to it.

The vehicle according to the invention may be in particular an industrial or service robot, or part of an industrial or service robot.

Besides the function of controlling the illumination devices depending on the direction of motion of the vehicle, the control device may also have the function of controlling the propulsion of the wheels and/or the function of controlling the direction of motion of the wheels and/or the function of controlling the velocity of motion of the wheels and/or the function of controlling the industrial robot.

The emission of the visual signals, and here in particular the illumination of the wheels, may be in general of any desired type, for example in the form of a constant light, a flashing light of constant frequency or variable frequency, a differently colored light and the like. It would also be conceivable that the illumination device uses different colors for each wheel, in which case the direction of travel, the velocity, an intended change of direction, etc., can be signaled via the particular color chosen.

There can also be provision for the type of motion of the multidirectionally movable vehicle to be indicated via the controllable illumination device. For example, in the case of a platform rotating in place the frequency of flashing could be increased (or reduced). Furthermore, in this case a chase light (comparable to a chain of lights) which runs in the direction of rotation of the multidirectionally movable vehicle and for which the wheels or their assigned lights are used, could indicate the direction of motion.

According to one variant of the vehicle according to the invention, initially all of the illumination devices are activated. The chosen and/or intended direction of travel of the vehicle is then indicated via different light colors that are emitted by the particular illumination devices.

In addition or alternatively, there may be provision for displaying information about the velocity, the intended direction of travel, an intended change of direction, etc. by the change in intensity of the controllable illumination device. In particular, it would be particularly preferable here for the velocity to be indicated via the intensity of the illumination device, for example by having a greater intensity allow the conclusion that the velocity of the vehicle is greater.

It is also possible for the controllable illumination devices to be activated with a time offset, for example before the vehicle begins to move, so as to indicate the impending start of travel to an outsider even before the vehicle begins to move again, i.e., while the vehicle is still stopped. This time-shifted activation or changing of the state of the illumination device may also be used in order to indicate a change of velocity, an intended change of travel direction and the like even before it occurs.

Figure 1B:
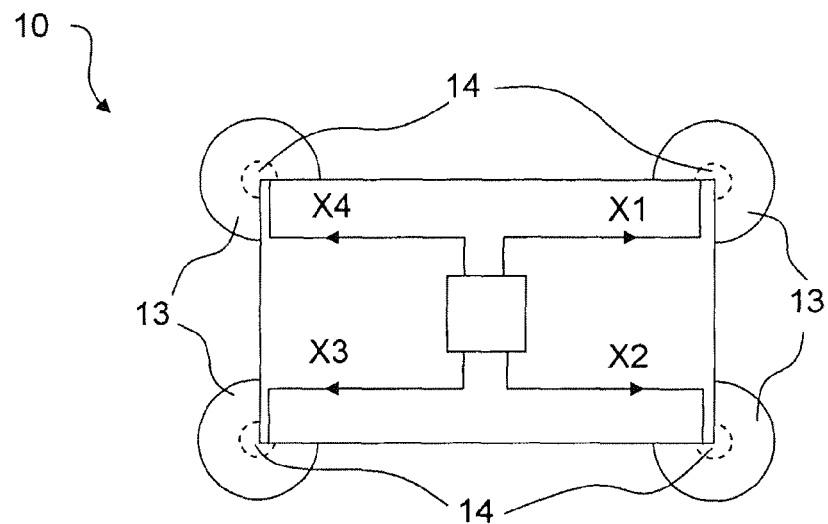
Figure 2:
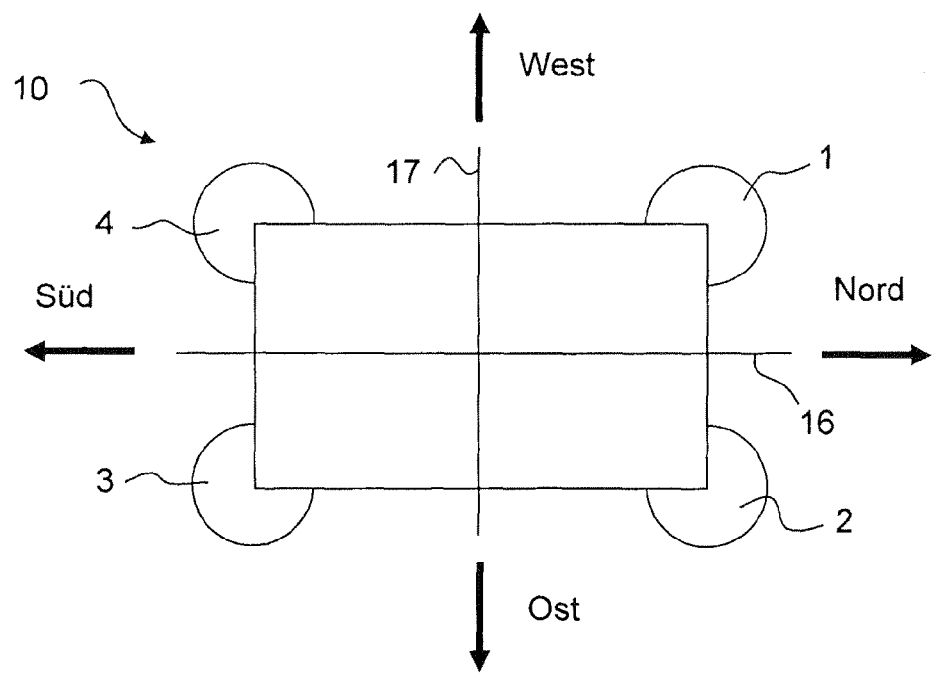
Figure 3:
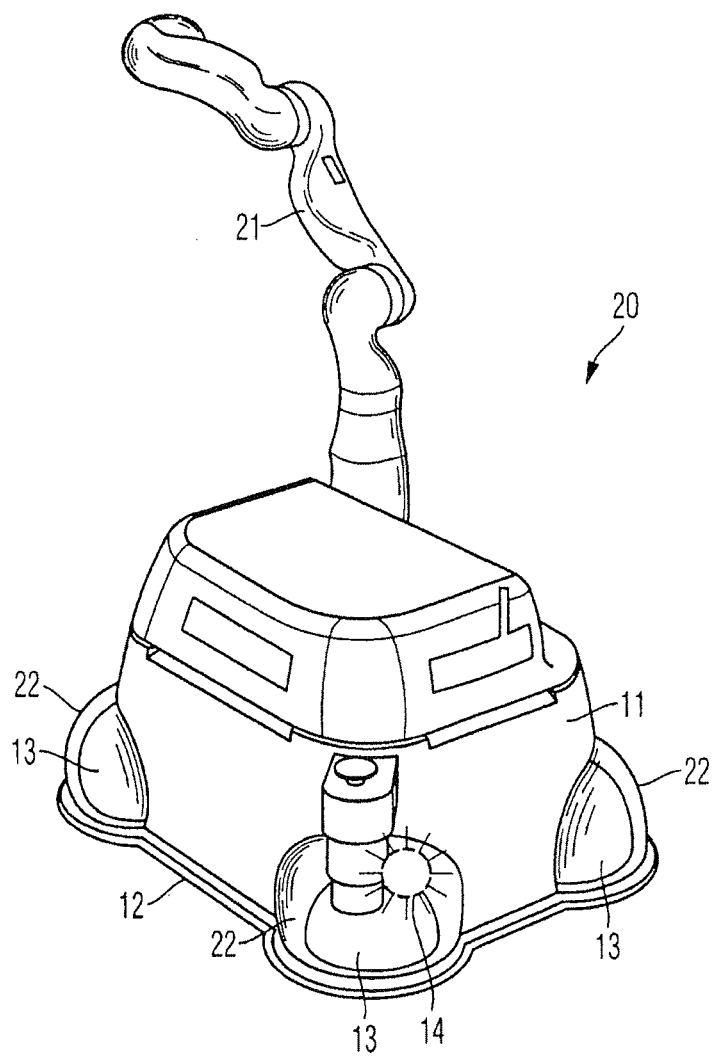

Examples of exemplary embodiments of the invention are depicted in the accompanying schematic figures of the drawing. The figures show the following:

FIG. 1A a perspective view of a first general exemplary embodiment of the multidirectionally movable vehicle according to the invention, FIG. 1B a top view of the vehicle from FIG. 1A, FIG. 2 a schematic depiction of a vehicle according to the invention to explain various operating modes, and FIG. 3 a perspective depiction of a second, preferred exemplary embodiment of a multidirectionally movable vehicle according to the invention.

In the figures of the drawing, like and functionally equivalent elements and features are given the same reference symbols-unless indicated otherwise.

FIG. 1A shows a perspective view and FIG. 1B shows a top view of a driverless transport system (DTS) to explain a first general exemplary embodiment of a vehicle according to the invention. The vehicle is designed here as an omnidirectional vehicle, i.e., one that can be moved horizontally in all directions. The vehicle designated by reference symbol 10 has a vehicle body 11, 12, which includes a vehicle body unit 11 and a platform attached to it. Vehicle 10 also has four wheels 13. These wheels 13 are attached to platform 12 of vehicle 10 in a known manner. The wheels 13 here are placed essentially at the respective four corners of vehicle 10.

The vehicle also has various illumination devices 14. These illumination devices 14 in this case are elements of a particular wheel 13; they may be placed on wheel 13 or may be integrated into the wheel. It is particularly preferred that a respective illumination device 14 be integrated into the wheel 13 assigned to it, i.e., that it be situated in the interior of the respective wheel 13. In that case it is necessary for the respective wheel 13 to be at least partially of transparent construction, so that the light emitted by the illumination device 14 assigned to this wheel can also radiate outward.

In addition or alternatively, it would also be conceivable for an illumination device to be situated on body 11 in the immediate vicinity of a wheel 13 assigned to it. Such an illumination device is designated with reference symbol 15 in the exemplary embodiment in FIG. 1A. This illumination device 15 can be designed to beam light outward (i.e., away from vehicle 10). In addition or alternatively, it would also be conceivable that this illumination device 15 shines on the particular wheel assigned to it and thus illuminates it.

Conventional light sources such as halogen lights, gas discharge lamps, neon lights, light-emitting diodes, LED systems and the like may be used as illumination devices 14, 15.

Vehicle 10 also has a control device 16, which is designed to control illumination devices 14, 15. This means that corresponding control signals X1 through X4 are producible through control device 16, by which illumination devices 14, 15 are triggerable accordingly. The activation of these illumination devices 14, 15 depends on the triggering and the nature and manner of construction of these illumination devices 14, 15. At the same time, depending on the design, it may be provided that these illumination devices 14, 15 are merely switched on or off and thus emit light or not. In addition, it may also be provided that these illumination devices produce a flashing light with constant or varying frequency. In addition or alternatively, it may also be provided that these illumination devices emit a differently colored light depending on the triggering. This frequency may also give an outsider information about the direction of travel.

Let it be assumed that these wheels 13 are designed as Mecanum wheels, as an example of omnidirectional wheels. Such a Mecanum wheel has for example two wheel disks rigidly joined together, between which a plurality of rolling bodies are mounted so that they are rotatable in reference to their longitudinal axes. These two wheel disks may be rotatably mounted in reference to an axis of rotation, and may be driven by means of a drive in such a way that the two wheel disks turn in reference to their axis of rotation. The construction and manner of functioning of a Mecanum wheel is described for example in U.S. Pat. No. 3,876,255, and the mounting of such a Mecanum wheel on a vehicle is described in DE 20 2004 015 422 U1. The entire content of these two publications is included in the present patent application in regard to the construction of the Mecanum wheel and its mounting on a vehicle.

FIG. 2 shows a schematic depiction of the multidirectionally movable vehicle according to the invention from FIGS. 1A, 1B, to explain various operating modes.

In FIG. 2 the various positions of the wheels 13 on the vehicle 10 are designated by 1 through 4.

Vehicle 10 is movable by way of the omnidirectionally movable wheels 13 in all four compass directions (west, north, east, south), as indicated in FIG. 2 by the arrows. Now let it be assumed that each of these wheels 13 has an illumination device 14 provided in or on the wheel 13. These wheels 13 are operated through control device 16 (not shown here) according to the manner depicted in the following Table 1, depending on the intended or planned direction of travel:

TABLE 1

| Direction of travel | Illuminated wheels |
|---|---|
| north | 1 and 2 |
| east | 2 and 3 |
| south | 3 and 4 |
| west | 4 and 1 |
| northwest (diagonally) | 1 |
| northeast (diagonally) | 2 |
| southeast (diagonally) | 3 |
| southwest (diagonally) | 4 |
| rotating in place, from north through east and south to west | 1-2-3-4 . . . (as a chase light) |

TABLE 1-continued

| Direction of travel | Illuminated wheels |
|---|---|
| rotating in place, from north through west and south to east | 1-4-3-2 . . . (as a chase light) |

For a planned travel direction "north" wheels 1 and 2 are thus illuminated, for a travel direction "east" wheels 2 and 3 are illuminated, for a travel direction "south" wheels 3 and 4 are illuminated and for a travel direction "west" wheels 1 and 4 are illuminated.

Thus two adjacent wheels 13 are activated when vehicle 10 moves along one of its vehicle axes 17, 18, those wheels 13 being illuminated in this case which lie in the direction of vehicle 10 in reference to one of its vehicle axes 17, 18.

It is thereby signaled to an outsider that vehicle 10 is moving in the direction of the particular vehicle axis 17, 18 assigned to the illuminated wheels 13.

In addition, a motion of vehicle 10 transverse to one of these vehicle axes 17, 18, for example diagonally, would naturally also be conceivable. In the case of such a diagonal motion, appropriately only a single one of these wheels 13 would be illuminated via its illumination device 14. For example, in the case of a diagonal motion in the northwest direction wheel 1 would be illuminated, for a motion in the northeast direction wheel 2, for a motion in the southeast direction wheel 3 and for a motion in the southwest direction wheel 4.

It is thus signaled to an outsider that vehicle 10 is moving in the direction of the particular illuminated wheel 13.

Besides these just-named linear motions in the direction of a vehicle axis 17, 18 of a vehicle 10 or a motion diagonal thereto, it would also be possible for vehicle 10 to rotate in place in the clockwise or counterclockwise direction (in reference to the top view of vehicle 10). In the case of a rotation of vehicle 10 in the clockwise direction, i.e., when rotating from north through east to south, the individual illumination devices 14 of the various wheels 13 could be activated in such a way that they form in a sense a chase light (comparable to a chain of lights), where the illumination devices 14 or the wheels 13 assigned to them are then illuminated sequentially in the clockwise direction. In this case the wheels 1-2-3-4-1-etc. would be illuminated sequentially. It would then be signaled to an outsider that vehicle 10 is moving in place in the clockwise direction. In the opposite case, i.e., if vehicle 10 is moving in the counterclockwise direction, the illumination devices 14 or the wheels 13 assigned to them could be illuminated in the opposite direction as a chase light.

FIG. 3 shows a perspective depiction of a second, particularly preferred exemplary embodiment of a multidirectionally movable vehicle according to the invention. Unlike the exemplary embodiment in FIGS. 1A, 1B, here the vehicle is designed as an omnidirectionally movable industrial robot. This industrial robot 20 is essentially analogous in design to the vehicle 10 from FIGS. 1A, 1B. In addition, here there is attached to the body 11 a robot arm 21, whose construction and manner of functioning are not explained here in greater detail, however.

Furthermore, unlike the exemplary embodiment in FIG. 1A, here the individual wheels 14 [sic.-apparently should be 13] are each situated in a wheel house, which completely encloses the wheel 13 assigned to this wheel house toward the outside. This wheel house 22 is constructed toward the outside as an at least partially translucent Plexiglas pane 22. Also provided in the interior of wheel house 22 is the illumination device 14 assigned to the particular wheel 13. If this illumination device 14 is activated via control device 16 (not depicted here in further detail), then this illumination device 14 illuminates the assigned wheel 13, which is then visible toward the outside.

The invention claimed is:

1. A multidirectionally movable vehicle, comprising:
    a vehicle body;
    a plurality of multidirectionally movable wheels operatively coupled to said vehicle body for moving the vehicle; and
    a plurality of illumination devices, wherein each said illumination device is positioned proximate and is associated with a respective one of said wheels and provides a visual indication to observers outside the vehicle;
    wherein at least one of said illumination devices is activated in a manner that visually indicates a direction of motion of the vehicle prior to or during such motion.

2. The multidirectionally movable vehicle of claim 1, further comprising a control device communicating with and controlling the activation of said illumination devices to indicate or communicate the direction of motion of the vehicle.

3. The multidirectionally movable vehicle of claim 2, wherein said control device further controls at least one of:
    propulsion of said wheels;
    direction of motion of said wheels; or
    rate of motion of said wheels.

4. The multidirectionally movable vehicle of claim 1, wherein at least one of said illumination devices is disposed on said respectively associated wheel.

5. The multidirectionally movable vehicle of claim 1, wherein at least one of said illumination devices is positioned within said respectively associated wheel.

6. The multidirectionally movable vehicle of claim 1, wherein activation of said at least one illumination device illuminates said respectively associated wheel.

7. The multidirectionally movable vehicle of claim 1, further comprising:
    at least one housing surrounding at least one of said plurality of wheels;
    wherein said illumination device associated with said at least one wheel is located in said housing.

8. The multidirectionally movable vehicle of claim 7, wherein at least a portion of said housing is at least partially translucent to facilitate visibility of said illumination device from a location outside of the vehicle.

9. The multidirectionally movable vehicle of claim 1, wherein the vehicle comprises four of said multidirectionally movable wheels, wherein each said wheel is omnidirectionally movable and has at least one associated illumination device.

10. The multidirectionally movable vehicle of claim 1, further comprising:
    a robot supported on said vehicle body.

11. A method of operating a multidirectionally movable vehicle having a plurality of wheels and a plurality of illumination devices, wherein each illumination device is positioned proximate and is associated with a respective one of the wheels, the method comprising:
    actuating at least one of the plurality of wheels of the vehicle to move the vehicle in a desired direction; and
    activating at least one illumination device associated with one of the plurality of wheels to visually indicate outside of the vehicle a current or intended direction of motion of the vehicle.

12. The method of claim 11, wherein activating at least one illumination device illuminates at least one of the plurality of wheels.

13. The method of claim 11, wherein the visual indication comprises at least one of:
- a constant light;
- a flashing light of constant frequency;
- a flashing light of variable frequency; or
- a light of a particular color.

14. The method of claim 11, wherein activating at least one illumination device comprises visually indicating a different color for each respectively associated wheel.

15. The method of claim 11, wherein activating at least one illumination device comprises visually indicating a different color to communicate at least one of:
- a direction of motion of the vehicle;
- a velocity of the vehicle; or
- an intended change in direction of motion of the vehicle.

16. The method of claim 11, wherein a rotational movement of the vehicle is indicated by selectively activating a plurality of illumination devices sequentially to visually indicate a chase light moving in a clockwise or counterclockwise direction.

17. The method of claim 11, wherein all of a plurality of illumination devices are activated and the direction of motion of the vehicle is visually indicated by different colors emitted by the illumination devices.

18. The method of claim 11, further comprising actuating at least one illumination device associated with one of said plurality of wheels to change in intensity to thereby visually indicate at least one of:
- a direction of motion of the vehicle;
- a velocity of the vehicle; or
- an intended change in direction of motion of the vehicle.

19. The method of claim 11, further comprising actuating at least one illumination device associated with one of said plurality of wheels to visually indicate at least one of the following vehicle actions prior to the occurrence of such action:
- a change in direction of motion of the vehicle;
- a change in velocity of the vehicle; or
- commencement of motion of the vehicle.

* * * * *